T. COFFIN.
Glass House-Pots.

No. 209,606.                Patented Nov. 5, 1878.

UNITED STATES PATENT OFFICE.

THOMAS COFFIN, OF BALDWIN TOWNSHIP, ALLEGHENY COUNTY, ASSIGNOR TO THOMAS COFFIN & CO., OF PITTSBURG, PENNSYLVANIA.

IMPROVEMENT IN GLASS-HOUSE POTS.

Specification forming part of Letters Patent No. 209,606, dated November 5, 1878; application filed October 18, 1878.

*To all whom it may concern:*

Be it known that I, THOMAS COFFIN, of Baldwin township, county of Allegheny, State of Pennsylvania, have invented or discovered a new and useful Improvement in Glass-House Pots; and I do hereby declare the following to be a full, clear, concise, and exact description thereof, reference being had to the accompanying drawings, making a part of this specification, in which—like letters indicating like parts—

Figure 1:
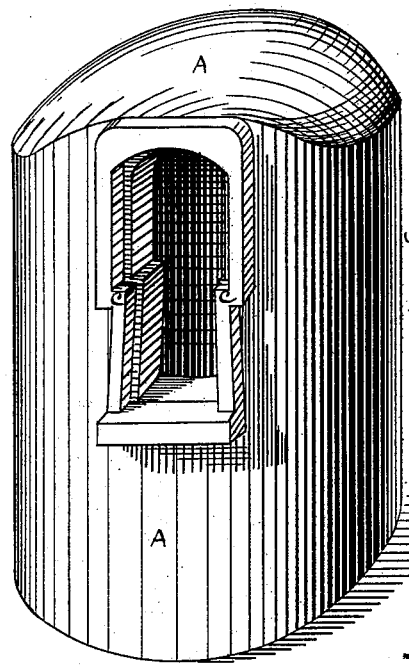
Figure 2:
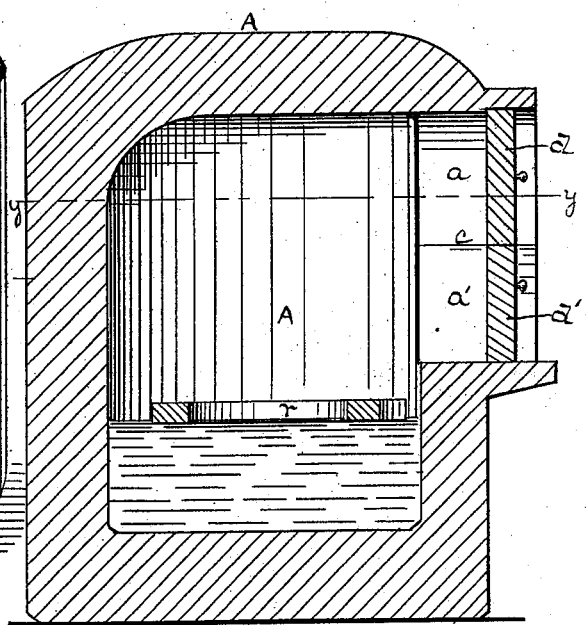
Figure 3:
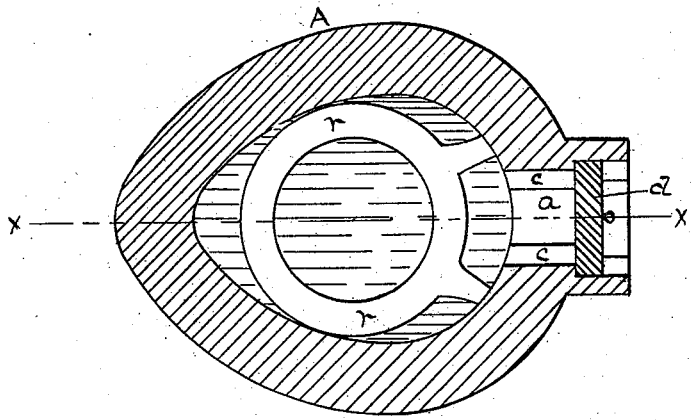

Figure 1 is a front perspective of my improved glass-house pot. Fig. 2 is a vertical section thereof in the line of $x\,x$, Fig. 3, and Fig. 3 is a horizontal section in the line $y\,y$ of Fig. 2.

Until within a few years glass-house pots were made with a single charging and working hole or mouth in one side near the top. This was an exceedingly inconvenient structure in working out the contents of the pot when the glass got low. To overcome this objection, Scanlon, in 1869, patented a pot made with two mouths, one a little below the other. In neither of these structures was any provision made for the introduction of a new ring when the one which was made inside the pot had become burned out, broken, or otherwise destroyed.

In my present invention I improve on these structures by making a single mouth vertically elongated, by preference to such extent or height that a new ring may be placed within the pot whenever required, and I make such mouth with side ledges, shoulders, or other supports, so that two or more stoppers may be employed independently of each other, each such stopper being separately insertible and removable.

By inserting the lower stopper or stoppers the pot may be filled, the contents melted, and the upper part of the molten glass worked off in the usual way with or without refilling. As the level of the molten glass in the pot goes down the upper stopper or stoppers may be inserted, the lower one removed, and the work go on.

I have shown in the drawings only two stoppers, that being enough to illustrate my invention; but, following the same principles of construction, one or two more may be added if desired.

A represents a glass-house pot, having a mouth, $a\,a'$, somewhat longer or higher vertically than is usual in the single-mouth pots. Preferably I make it high enough for a new ring, $r$, to be passed through it and into the pot when the old one (put in when the pot is made) burns out or is broken or otherwise destroyed, it being a well-known fact that a single ring will seldom, if ever, last as long as the pot does. In the side walls of this mouth I make ledges or shoulders $c$, such as will support the upper stopper, $d$, independently of the stopper $d'$ below, and so that either stopper $d$ or $d'$, or both, may be inserted or removed at pleasure. The form of this shoulder or ledge is not material, and any known or desired form of support may be employed which will keep the upper stopper in place while the lower one is out. The lowest stopper rests on the bottom of the mouth and intermediate stoppers, if more than two are employed, are to be independently supported and independently removable, in like manner as described with reference to the upper one.

The filling of the pot, melting, and working of the contents are done in the usual way.

I claim herewith as my invention—

1. A glass-house pot or crucible having in its mouth ledges or shoulders or supports for two or more stoppers, whereby each stopper may be removed or inserted independently of the stopper immediately above or below, substantially as set forth.

2. A glass-house pot or crucible having a mouth vertically high enough to admit the usual ring, in combination with two or more stoppers independently supported, whereby each is separately removable, substantially as set forth.

In testimony whereof I have hereunto set my hand.

THOMAS COFFIN.

Witnesses:
   R. H. WHITTLESEY,
   GEORGE H. CHRISTY.